No. 834,330. PATENTED OCT. 30, 1906.
S. T. SIMMONS.
NUT LOCK.
APPLICATION FILED FEB. 9, 1906.
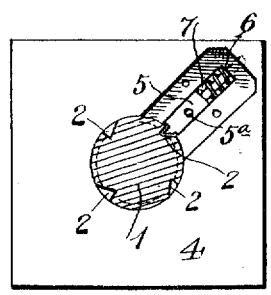
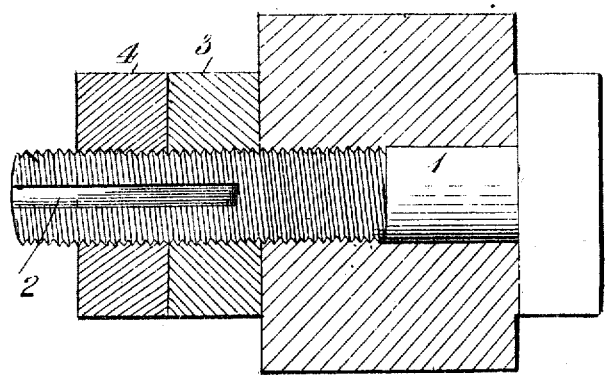
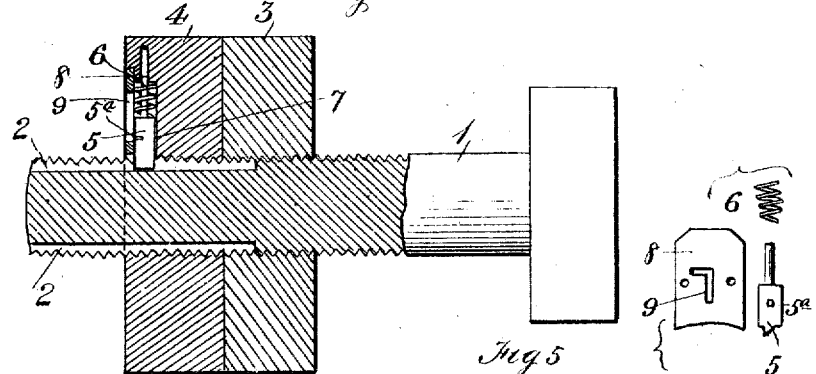
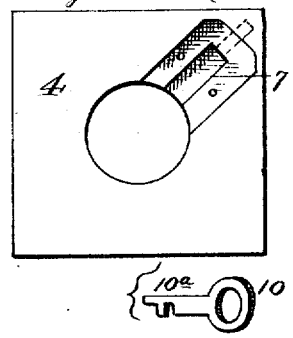
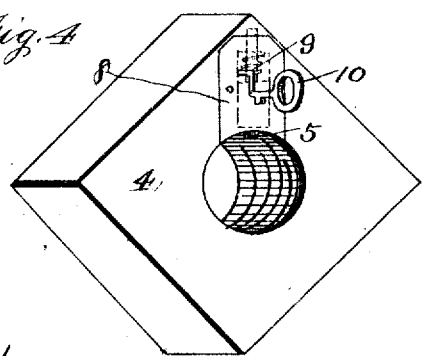
WITNESSES:
INVENTOR:
Samuel T. Simmons,
By
Attorneys

UNITED STATES PATENT OFFICE.

SAMUEL T. SIMMONS, OF COLUMBUS, OHIO.

NUT-LOCK.

No. 834,330.

Specification of Letters Patent.

Patented Oct. 30, 1906.

Application filed February 9, 1906. Serial No. 300,312.

*To all whom it may concern:*

Be it known that I, SAMUEL T. SIMMONS, a citizen of the United States, residing at Columbus, in the county of Franklin and State of Ohio, have invented certain new and useful Improvements in Nut-Locks, of which the following is a specification.

My invention pertains to improvements in what may be termed "nut-locks." Its object is to prevent the accidental unscrewing or displacement of the nut, particularly from the transmitting of a jarring action or otherwise, and in addition to provide for the ready application of the nuts and the interlocking of the same and their carrying-bolt, and, further, to carry out these ends in a simple, economic, and effective manner.

Said invention consists of certain structural features substantially as hereinafter fully disclosed, and specifically pointed out by the claim.

In the accompanying drawings, illustrating the preferred embodiment of my invention, Figure 1 is a view showing it as applied to a bolt for practical use. Fig. 2 is a cross-section taken through the bolt viewing the same from the nut-equipped end. Fig. 3 is a longitudinal section in part and partly in side view. Fig. 4 is a view of the locking-nut with the key in position therein as in unlocking or withdrawing the spring-retained pin or detent from the bolt. Fig. 5 shows said nut with its adjunctive parts disassembled.

In practicing my invention I employ a bolt 1, having a number or series of axial or longitudinal grooves or notches 2 indenting or severing a portion of its screw-thread—say at intervals or arcs apart each of about ninety degrees of the circular outline of the bolt—the purpose of which will presently be seen. Upon said bolt is placed or applied two nuts 3 and 4, respectively, the former nut 3 directly engaging, abutting, or jamming the object or body through which the bolt is passed for securing the same, as readily understood. The nut 4 is screwed against or engages the nut 3 for its retention in place, as aforesaid. Said nut 4 is equipped with a pin or detent 5, having near its outer end a lateral notch or socket 5ª, the purpose of which will later appear, and which detent or pin is arranged to normally project into the bolt-passage of the nut and entering or engaging the requisite or -registering one of the series of notches or grooves 2 of the bolt 1, according to the position said pin or detent may assume when the nut 4 has reached the nut 3 in screwing it "home." Said pin or detent is suitably held in its normal of projected position by the stress or tension of a spring 6, arranged or inserted in behind it, the latter being suitably housed, together with said pin, within a slot or recess 7, produced in the nut 4. After laterally introducing said bolt and spring in position, as noted, they are suitably confined against lateral displacement by a plate 8, itself secured to the nut 4 over said recess or slot 7, as shown, or otherwise. Said closure or plate 8 has produced therein an inverted-L form of slot 9, with one portion or leg opposed to the notch or socket 5ª of the pin or detent 5, and fitted to operate in this slot is a key 10, having a lateral bit or stud 10ª, adapted to be brought into register or engagement with the lateral arm of the slot 9, as presently disclosed.

It is noted that with the parts or nuts in position upon the bolt, as aforesaid, the detent 5 is effective for their retention in normal position against any possible displacement from any jarring action which may be transmitted thereto, and yet they are readily removable. This latter may be easily accomplished by the aid of the key 10 by inserting its stem portion through the slot 9 in the escutcheon-plate 8, adjunctive of the nut 4, and into the lateral notch or socket 5ª of the detent or pin 5 and then forcing upward upon the key until its bit or stud 10ª is brought into alinement with the lateral portion or arm of said slot, when by rotating the key and pushing it inward or at right angles to its previous movement the bit of the key is lodged within the arm of the slot. The detent thus of course being similarly moved will be accordingly withdrawn or retracted from the corresponding groove or notch in the bolt and be retained in its retracted position, when the locking-nut may be removed, together with the other nut and bolt, as may be required.

I claim—

A nut-lock comprising a bolt and a plurality of nuts having screw-threaded connection with said bolt, one of said nuts being equipped with a spring-projected detent engaging an axial groove in said bolt and having a lateral notch or socket near its outer or projected end, said nut having also an L-shaped slot, with one portion opposed to said socket in said detent, said nut adapted to have applied thereto a key with its stem effective to engage said socket or notch and having a lateral stud or bit engaging the lateral portion or arm of said L-shaped slot.

In testimony whereof I have signed my name to this specification in the presence of two subscribing witnesses.

SAMUEL T. SIMMONS.

Witnesses:
 W. T. MOORE,
 LULU LINDEMANN.